(12) United States Patent
Abrams et al.

(10) Patent No.: US 7,590,690 B2
(45) Date of Patent: Sep. 15, 2009

(54) AIR EMISSION AVOIDANCE AND TRACKING THROUGH THE USE OF ONLINE WEB CONFERENCING

(75) Inventors: Ethan Terry Abrams, Phoenix, AZ (US); Marie Prentice, Pasadena, CA (US)

(73) Assignee: ILinc Communications, Inc., Phoenix, AZ (US)

( * ) Notice: Subject to any disclaimer, the term of this patent is extended or adjusted under 35 U.S.C. 154(b) by 352 days.

(21) Appl. No.: 11/818,198

(22) Filed: Jun. 13, 2007

(65) Prior Publication Data
US 2008/0313276 A1    Dec. 18, 2008

(51) Int. Cl.
*G06F 15/16* (2006.01)
*G06F 15/173* (2006.01)

(52) U.S. Cl. ............... 709/204; 709/203; 709/207; 709/223; 709/224

(58) Field of Classification Search ........... 709/203, 709/204, 207, 223, 224; 705/7, 37, 199
See application file for complete search history.

(56) References Cited

U.S. PATENT DOCUMENTS 7,343,341 B2 * 3/2008 Sandor et al. ............ 705/37
2004/0049424 A1 * 3/2004 Murray et al. ........... 705/14
2008/0154671 A1 * 6/2008 Delk ..................... 705/7

* cited by examiner

*Primary Examiner*—Quang N. Nguyen
(74) *Attorney, Agent, or Firm*—Jackson Walker, LLP; Charles Kulkarni

(57) ABSTRACT

Participants and session leaders (i.e. users) are allowed to join online web conferences, online meetings, or online classes. The methods herein determine, among other variables, the total air emissions saved by being able to forego physical transportation of the users on account of being able to meet by an online web conference. In certain embodiments, the amount of $CO_2$ air emissions is determined. The air emission savings are then displayed on a user interface for one or more online web conferences. Aggregate air emission savings may also determined for a group of online web conferences. Advantages of the methods of the present invention include, among others, the ability to quantify the air emission savings from the use of online meeting technology and the ability to generate individualized and aggregated air emission reports based on one or more online web conferences or classes and/or company-wide air emission savings.

20 Claims, 6 Drawing Sheets

AIR EMISSION AVOIDANCE AND TRACKING THROUGH THE USE OF ONLINE WEB CONFERENCING

BACKGROUND

The present invention generally relates to systems and methods implemented in a computer system for determining air emissions saved from foregoing transportation modes through the use of online web conferencing, displaying avoided air emissions to users, and generating customized reports detailing avoided air emissions.

As concern for protection of the environment grows, the importance of companies showing responsible stewardship of the environment increases dramatically. Thus, methods which reduce and/or account for the reduction in air emissions and pollutants are desirable in that they allow companies to demonstrate their commitment to protecting the environment. Additionally, it is desirable to account for the environmental impact of various alternative actions to allow consumers to evaluate possible courses of action. As one example, consumers may be faced with a choice of traveling to a distant location for a training program, meeting, seminar, or class. By accounting for the environmental impact of alternatives such as using web conferencing instead of physical transportation, a consumer may be influenced to opt for web conferencing to aid in protecting the environment by foregoing physical transportation to a location. Additionally, by determining and accounting for the environmental impact of various courses of action, companies can demonstrate their positive impact on the environment by their selection and accounting of environmentally preferred choices.

SUMMARY

The present invention generally relates to systems and methods implemented in a computer system for determining air emissions saved from foregoing transportation modes through the use of online web conferencing, displaying avoided air emissions to users, and generating customized reports detailing avoided air emissions.

One example of a method implemented in an information handling system comprises: allowing a participant and a session leader to join an online meeting wherein the participant joins the online meeting by way of a participant networked computer and wherein the session leader joins the online meeting by way of a session leader networked computer; determining a participant IP address wherein the participant IP address corresponds to an IP address of the participant networked computer; determining a session leader IP address wherein the session leader IP address corresponds to an IP address of the session leader networked computer; determining a participant physical location corresponding to the participant IP address; determining a session leader physical location corresponding to the session leader IP address; determining a distance between the participant physical location and the session leader physical location; determining a quantity of air emission savings corresponding to foregoing a transportation of about twice the distance; and displaying the quantity of air emission savings on a user interface accessible by at least one participant and the session leader.

One example of a method implemented in an information handling system comprises: allowing a plurality of participants and a session leader to join an online meeting wherein each participant joins the online meeting by way of one or more participant networked computers and wherein the session leader joins the online meeting by way of a session leader networked computer; determining each participant IP address and a session leader IP address wherein each participant IP address corresponds to an IP address of the participant networked computer used by each participant to join the online meeting and wherein the session leader IP address corresponds to an IP address of the session leader networked computer; determining each participant physical location corresponding to each participant IP address and a session leader physical location corresponding to the session leader IP address; determining a plurality of participant distances between each participant physical location and the session leader physical location; determining a plurality of participant emissions quantities wherein each participant emissions quantity corresponds to foregoing a transportation of about twice each participant distance; determining a total air emission savings corresponding to about the sum of the plurality of participant emissions quantities; and displaying the total air emission savings on a user interface that is accessible by at least one of the plurality of participants.

One example of a method implemented in an information handling system comprises: allowing a plurality of participants and a session leader to join an online meeting wherein each participant joins the online meeting by way of one or more participant networked computers and wherein the session leader joins the online meeting by way of a session leader networked computer; determining each participant IP address and a session leader IP address wherein each participant IP address corresponds to an IP address of the participant networked computer used by each participant to join the online meeting and wherein the session leader IP address corresponds to an IP address of the session leader networked computer; determining each participant physical location corresponding to each participant IP address and a session leader physical location corresponding to the session leader IP address; determining a meeting location; determining a plurality of participant distances between each participant physical location and the meeting location; determining a session leader distance between the session leader physical location and the meeting location; determining a plurality of participant emissions quantities wherein each participant emissions quantity corresponds to foregoing a transportation of about twice each participant distance; determining a session leader emissions quantity wherein the session leader emissions quantity corresponds to foregoing a transportation of about twice the session leader distance; determining a total air emission meeting savings corresponding to about the sum of all of the participant emissions quantities and the session leader emission quantity; and displaying the total air emission meeting savings on a user interface accessible by at least the session leader.

One example of a networked computer system for online collaborative web meetings comprises: (a) electronics adapted to (1) calculate a total distance between a host and a plurality of participants based on IP addresses of the participants and (2) determine an air emissions reduction corresponding to foregoing a transportation of the total distance by the participants; and (b) a user interface adapted to display the air emissions reduction.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1A:
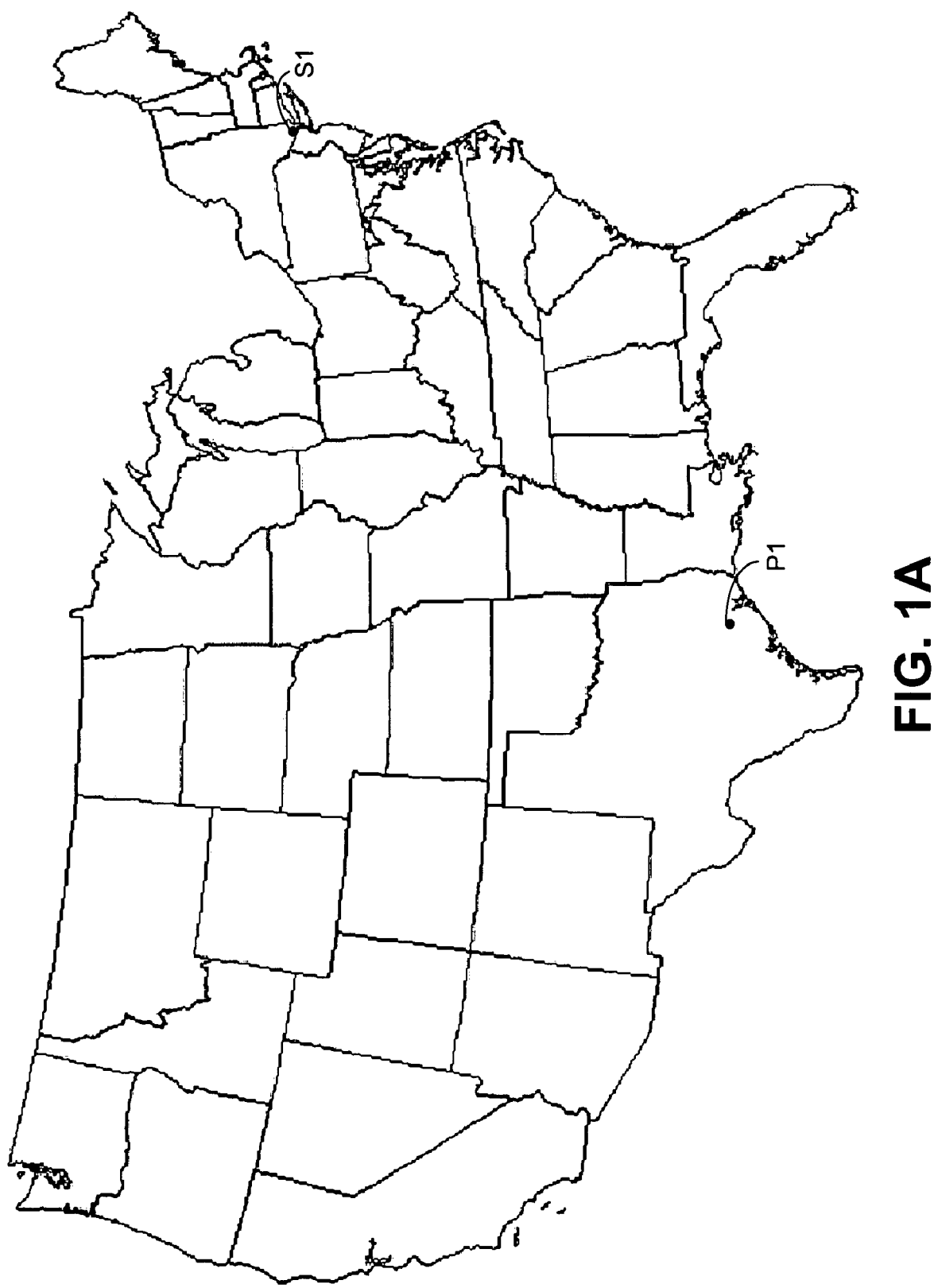
FIG. 1A shows a map with example physical locations of a participant and a session leader.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention generally relates to systems and methods implemented in a computer system for determining air emissions saved from foregoing transportation modes through the use of online web conferencing, displaying avoided air emissions to users, and generating customized reports detailing avoided air emissions.

Methods implemented in a computer system are provided that calculates distances between a host and online meeting participants and then, determines the corresponding air emissions savings from the participants having utilized online meeting technology instead of having used conventional transportation to meet at a common physical meeting location. In certain embodiments, carbon dioxide ($CO_2$) emission savings are determined and displayed to an end-user on a user-interface.

Advantages of the methods of the present invention include, among others, the ability to quantify the air emission savings from the use of online meeting technology and the ability to generate individualized and aggregated air emission reports based on one or more online web conferences, seminars, or classes and/or company-wide air emission savings.

To facilitate a better understanding of the present invention, the following examples of certain embodiments are given. In no way should the following examples be read to limit, or define, the scope of the invention.

FIG. 1A shows a map with example physical locations of a participant and a session leader. In FIG. 1A, P1 refers to an example location of a hypothetical participant, in this case, Houston, Tex., and S1 refers to an example location of a hypothetical session leader, in this case, New York, N.Y.

Figure 1B:
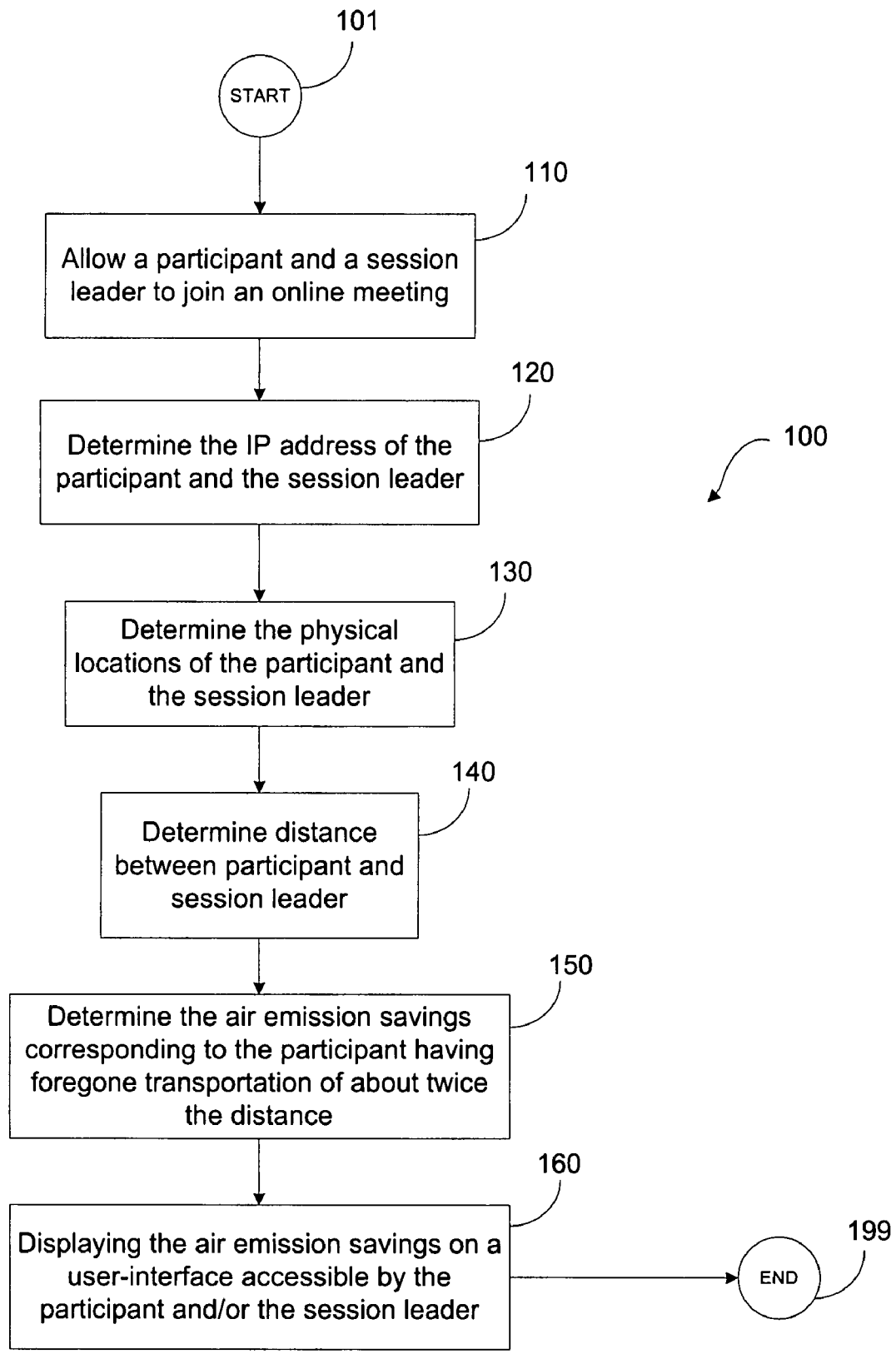
FIG. 1B illustrates an example of a method for determining an air emissions savings corresponding to using an online meeting to forego transportation of the participant.

FIG. 1B illustrates an example of a method for determining an air emissions savings corresponding to using an online meeting to forego transportation of the participant. Method 100 commences at step 101. In step 110, a participant and a session leader (or more generally, a user) join an online meeting. The term, "join," as used herein, refers to any action taken to subscribe or enlist a participant and/or a session leader to an online meeting and includes any action suitable to cause a participant and/or a session leader to become a member, become a member of, become a part of be, become joined or united or linked to an online meeting. The term, "online meeting," as used herein, includes any type of online teleconference, web conference, or any suitable online manner wherein individuals are brought together in a manner permitting shared voice and/or graphic sharing among the individuals through an automated networked computer system. In certain embodiments, a participant may join simply by indicating a desire to join an existing online meeting through a user interface by selecting an online meeting from a list of available online meetings In step 120, the IP address of the participant and the IP address session leader are determined. Any number of methods known in the art may be used to determine the IP address of the networked computer of the participant and the session leader. In certain embodiments, the web server provides each participant's IP Address as they join an online meeting or session based on the participant's end of the TCP socket making the join request. Other methods to determine the IP address of participants and session leaders that are known in the art may be employed in conjunction with the methods of the present invention.

In step 130, the physical locations of the participant and the session leader is determined or estimated by determining the physical locations corresponding to the IP address of the participant and the IP address of the session leader. Any number of methods may be used to determine the physical location corresponding to an IP address, including performing a WHOIS query and determining the registrant address corresponding to a user's IP address. Using the registrant address, a user's physical location may be determined using an address database or suitable mapping software. Any other suitable method known in the art may be used to determine the physical location corresponding to an IP address. FIG. 1B shows an example physical location of participant P1 (i.e. Houston) and session leader S1 (i.e. New York). The physical locations may be represented by longitude/latitude coordinates or any other type of coordinates for defining a location of participant P1 and session leader S1.

It is recognized that a user may be networked through a proxy connection or computer. In such an instance, instead of determining the IP address of the user, the IP address of the proxy connection will be instead determined. Thus, this method will end up estimating the user's physical location as the physical location of the proxy connection.

In step 140, the distance between participant P1 and session leader S1 is determined. The distance between these two points may be determined using standard trigonometric calculations. Alternatively, mapping software may be used to determine the distance between participant P1 and session leader S1. In the example depicted in FIG. 1B, a distance of 1,630 miles may be estimated as the driving distance between Houston and New York. Alternatively, a distance of 1,229 miles may be estimated as the flying distance between Houston and New York. In still other embodiments, a combination of ground transportation and air transportation may be assumed or selected. Any suitable method for determining the distance between two points may be used to determine the distance between participant P1 and session leader S1.

Based on the distance between participant P1 and session leader S1, an air emission savings is determined in step 150. The air emission savings corresponds to the quantity of air emission savings that result from foregoing transportation of the participant from the participant's physical location to the session leader's physical location. To determine the air emission savings, a mode of transportation may be assumed or selected. In certain embodiments, participant P1 is permitted to select the type of transportation that participant P1 would have used to travel to the session leader's physical location and back. In other embodiments, a mode of transportation is assumed. For example, for distances below a certain threshold (e.g. 200 miles), the method may assume that participant P1 would have driven using ground transportation to the destination and back if no online meeting opportunity were available. For distances above the threshold, the method may assume transportation by air travel by, for example, a commercial jet. Alternatively, any combination of transportation modes may be selected or assumed as desired to accomplish travel from participant P1's physical location to session leader S1's physical location and back.

Any suitable method may be used to estimate the air emission savings including assuming an average emissions rate that corresponds to a given mode of transportation. For example, an average emissions rate of 0.36 kg of $CO_2$ per mile (i.e. a $CO_2$ factor of 0.36) may be used to estimate the air emissions of a medium sized car. For an airplane mode of transportation, a $CO_2$ factor of 0.29 may be used for distances less 727 miles, a $CO_2$ factor of 0.20 may be used for distances between 727 miles and 2575 miles, and a $CO_2$ factor of 0.18 may be used to for distances greater than 2,575 miles. Any number of other suitable methods known in the art may be used to estimate $CO_2$ emissions or more generally, air emissions of a plurality of air pollutants, including, but not limited to $NO_x$ air emissions. Similarly, other $CO_2$ factors may be used for transportation by rail depending on the type of rail transport utilized.

Methods and factors suitable for determining air emissions, including $CO_2$ emissions may be found in the following references, all of which are hereby incorporated by reference: DEFRA, *Guidelines for Company Reporting on GHG Emissions*; U.S. Department of Energy, *Transportation Energy Data Book* (see e.g., Table 2.11 and A14-A16); Energy Information Administration, *Emissions of Greenhouse Gases in the United States* 2000 (see e.g., Appendix B, Table B1); and Energy Information Administration, Office of Integrated Analysis and Forecasting, U.S. Department of Energy, *Updated State-level Greenhouse Gas Emission Coefficients for Electricity Generation* 1998-2000 (April 2002).

In step 160, the air emissions savings is displayed on a user interface accessible by at least one participant and the session leader. Method 100 terminates at step 199.

Figure 2A:
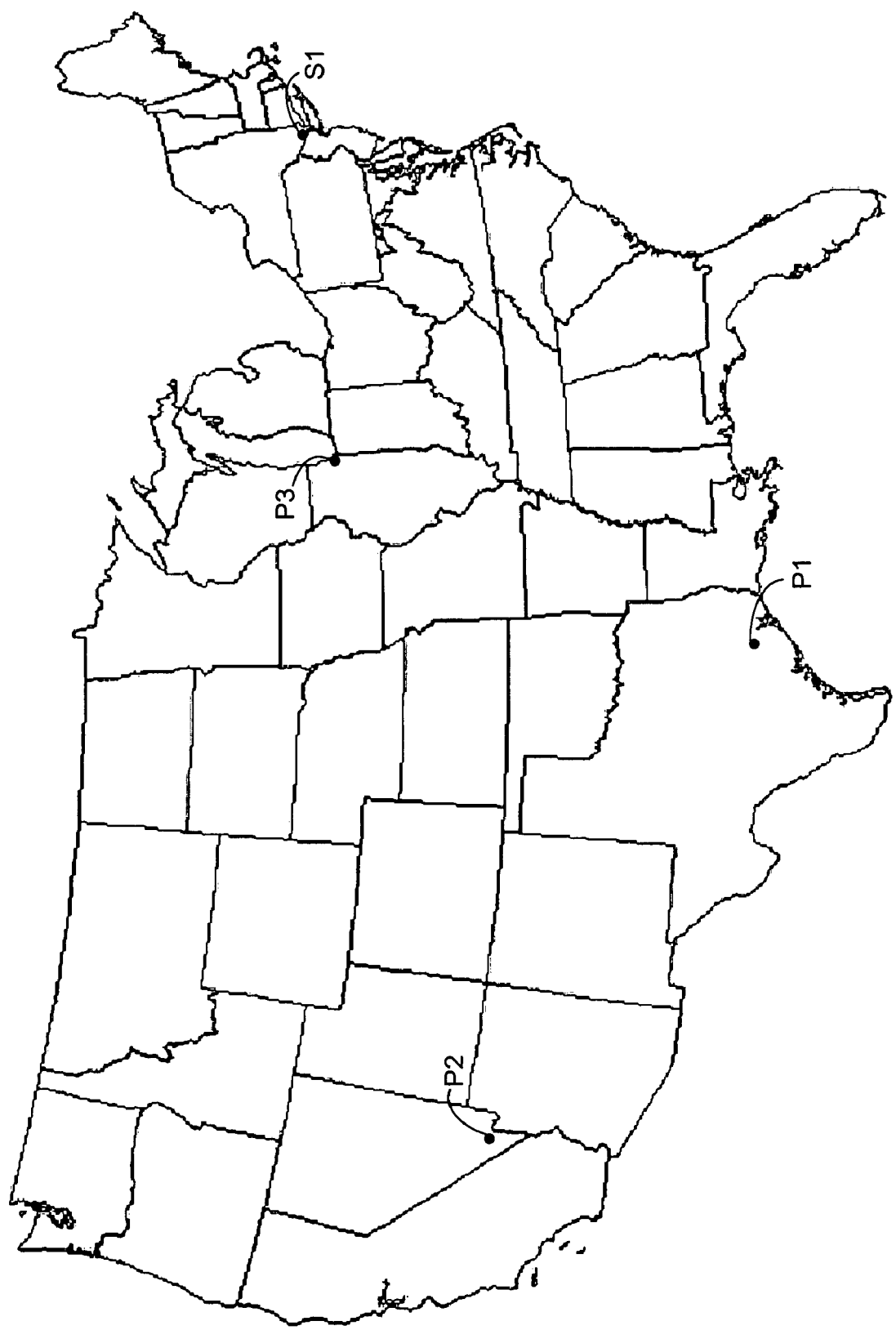
FIG. 2A shows a map with example physical locations of a session leader and a plurality of participants.

FIG. 2A shows a map with example physical locations of a session leader and a plurality of participants. In this example, the physical location of participant P1 is shown as Houston, Tex., participant P2 is shown in Las Vegas, Nev., participant P3 is shown in Chicago, Ill., and session leader S1 is shown in New York, N.Y.

Figure 2B:
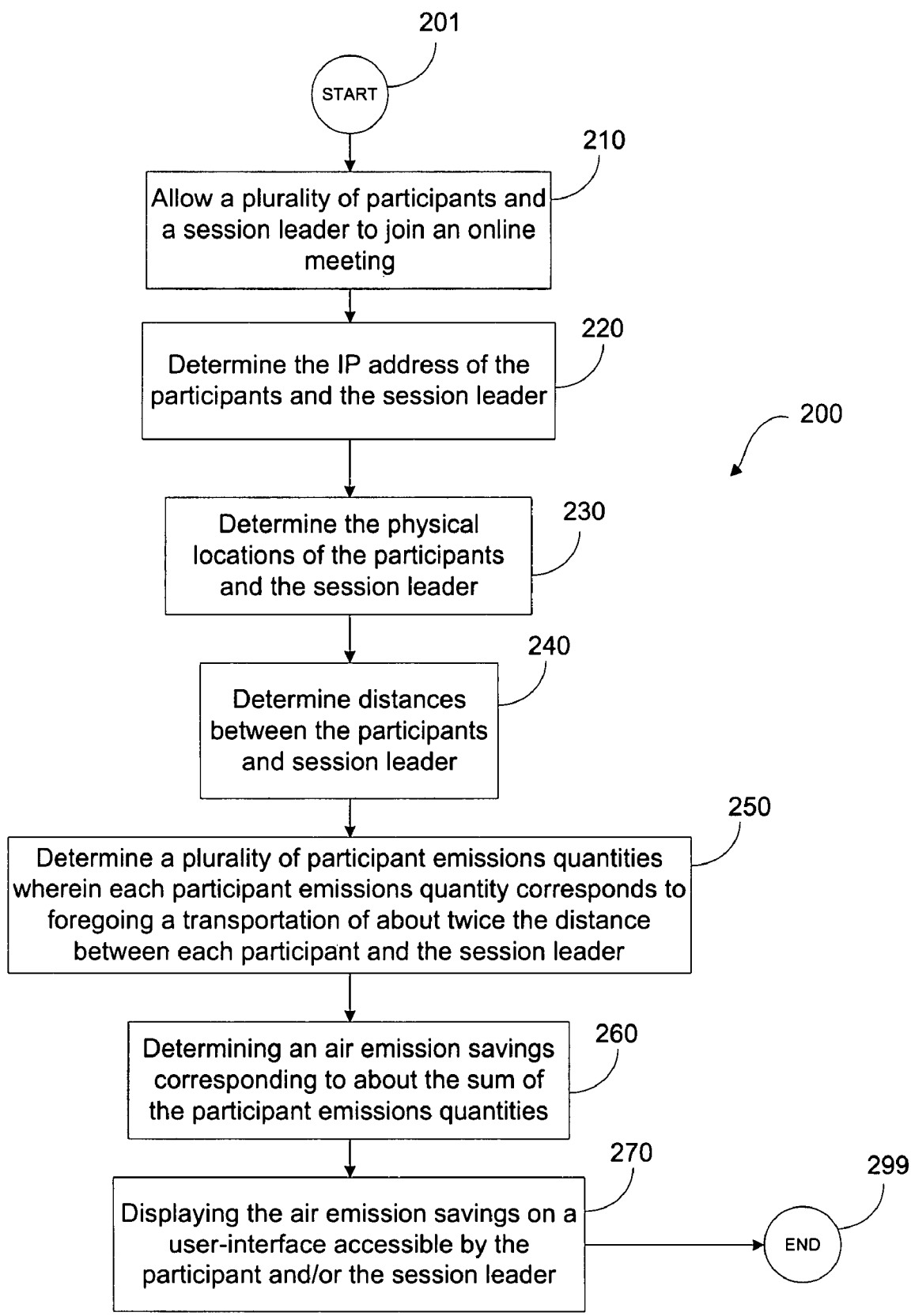
FIG. 2B illustrates an example of a method for determining an air emissions savings corresponding to using an online meeting to forego transportation of the participant.

FIG. 2B illustrates an example of a method for determining an air emissions savings corresponding to using an online meeting to forego transportation of the participant. Method 200 commences at step 201. In step 210, a session leader SL and a plurality of participants join an online meeting P1, P2, and P3. In step 220, the IP address of each user is determined. Based on the IP address of each user, the physical location of each user is ascertained in step 230.

In step 240, distances between the session leader and each participant is determined based on the physical locations of each user. Using the example locations depicted in FIG. 2A for reference, the driving distances from the physical location of each participant to the physical location of the session leader would be: about 1,641 miles from Houston to New York, about 2,521 miles from Las Vegas to New York, and about 790 miles from Chicago to New York. Alternatively, flying distances between the same physical locations would be: about 1,229 miles from Houston to New York, about 1,948 miles from Las Vegas to New York, and about 641 miles from Chicago to New York.

Based on the distances determined in step 240, participant emissions quantities are determined in step 250. The participant emissions quantities correspond to the quantity of air emission savings that result from foregoing transportation of each participant from each participant's physical location to the session leader's physical location. In step 260, an air emission savings corresponding to about the sum of the participant emissions quantities is determined.

In step 270, the air emissions savings determined in step 260 is displayed on a user interface accessible by at least one participant and the session leader. Method 200 terminates at step 299.

Figure 3A:
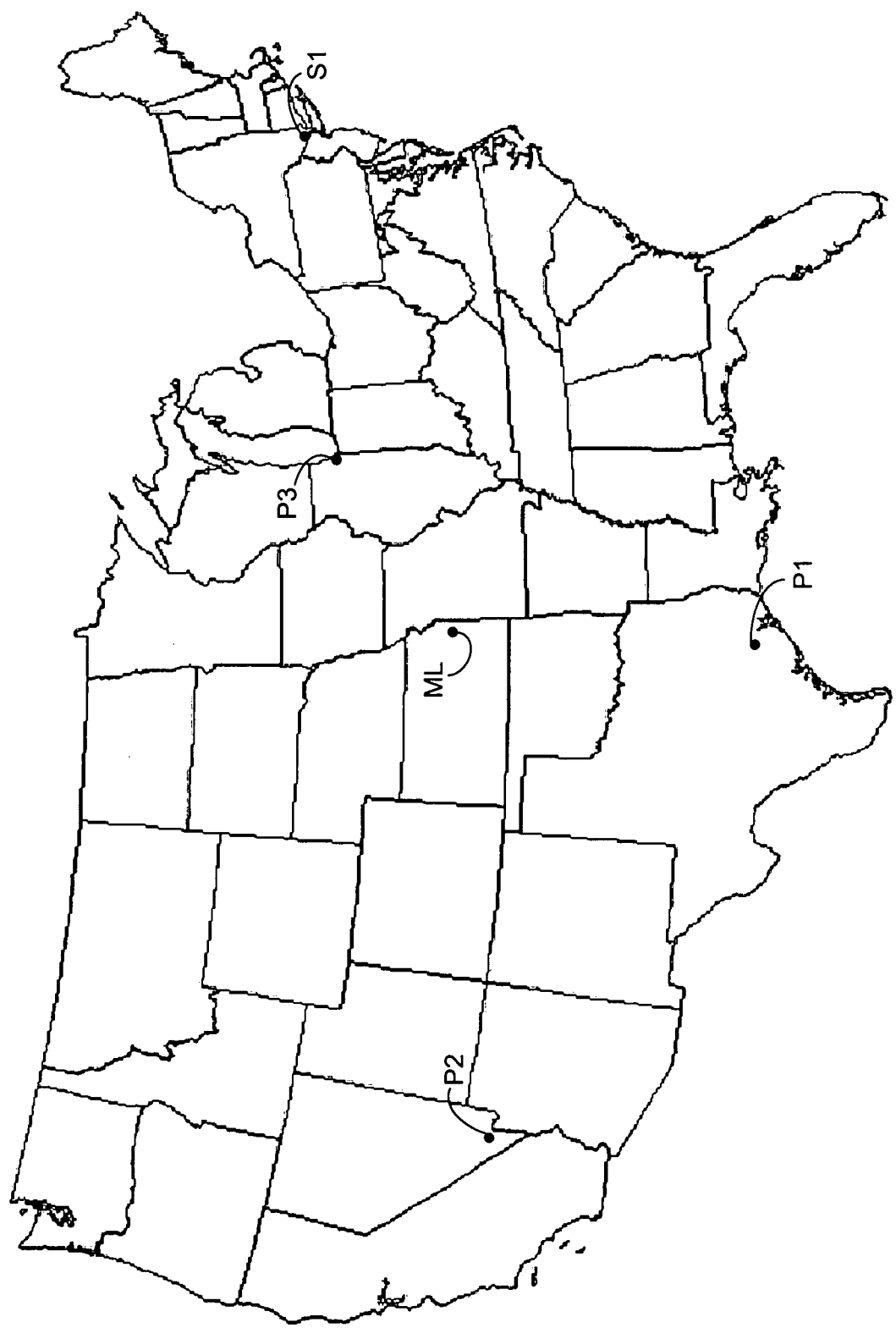
FIG. 3A shows a map with example physical locations of a meeting location, a session leader, and a plurality of participants.

FIG. 3A shows a map with example physical locations of a meeting location, a session leader, and a plurality of participants. In this example, the physical location of participant P1 is shown as Houston, Tex., participant P2 is shown in Las Vegas, Nev., participant P3 is shown in Chicago, Ill., session leader S1 is shown in New York, N.Y., the meeting location ML is shown as Kansas City, Kans.

Figure 3B:
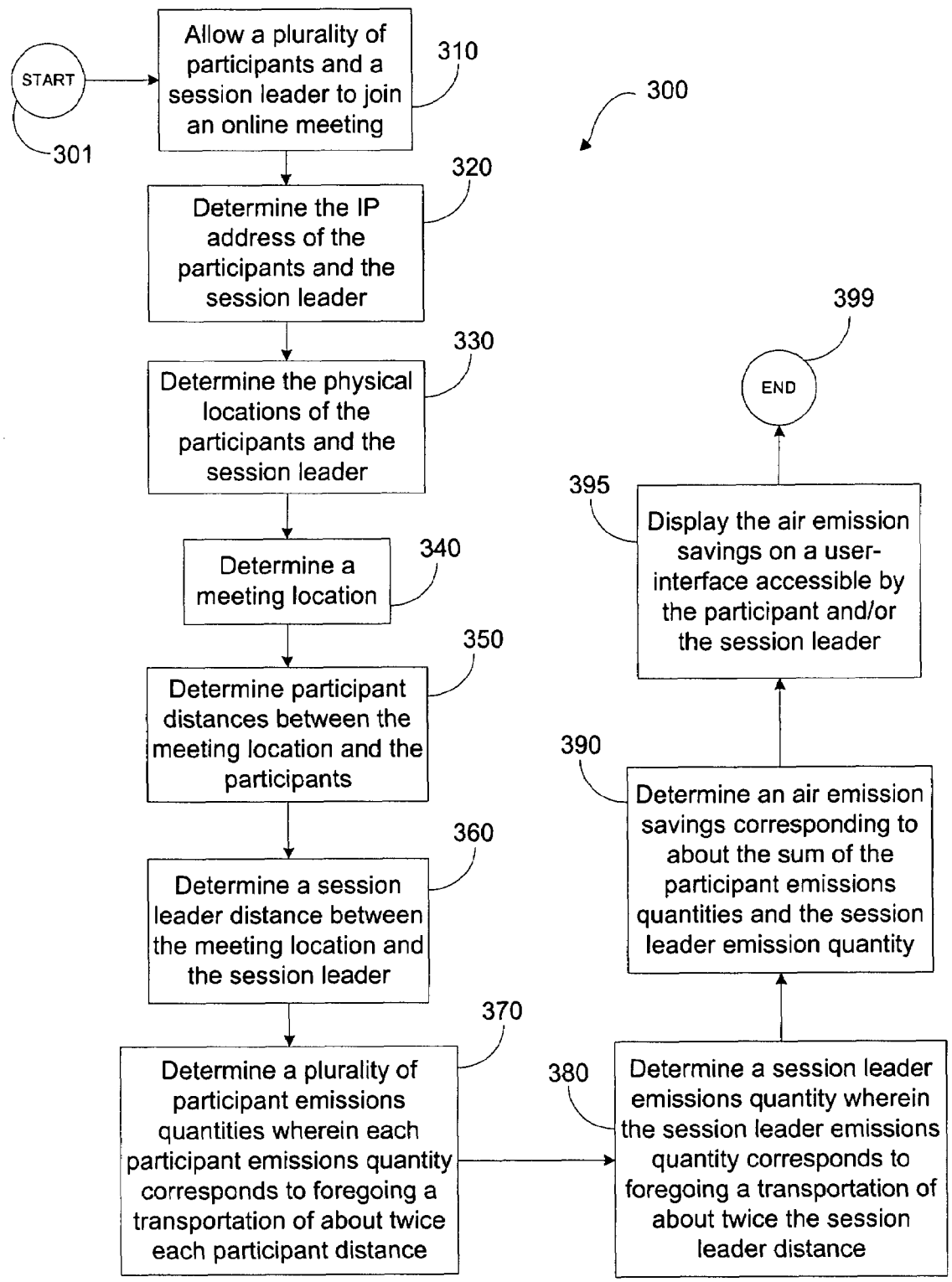
FIG. 3B illustrates an example of a method for determining an air emissions savings corresponding to using an online meeting to forego transportation of the participant.

Referring to FIG. 3B, method 300 commences at step 301. In step 310, a plurality of participants and a session leader join an online meeting. In step 320, the IP address of each user is determined. In step 330, the physical locations of each user is determined based on each user's respective IP address. A meeting location is determined in step 340. Distances between each participant and the meeting location is determined in step 350 to arrive at participant distances. The distance between the physical location of the session leader and the meeting location is determined in step 360. Based on the participant distances determined in step 350, participant emissions quantities are determined in step 370 where each participant emissions quantity corresponds to the air emissions saved from foregoing a transportation of about twice each participant distance. Likewise, a session leader emissions quantity is determined in step 380. In step 390, a total air emission savings is determined as the sum of the participant and session leader emissions quantities.

In any of the aforementioned embodiments, any variable relating to the aforementioned travel distances may be displayed on the user interface instead of air emissions savings including, but not limited to, total travel time saves by one or more participants, total travel distance of one or more participants, and any other suitable variable corresponding to the travel distance of one or more of the participant travel distances.

It is explicitly recognized that one or more methods of the present invention may be implemented via an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU or processor) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method implemented in an information handling system comprising:
    allowing a participant and a session leader to join an online meeting wherein the participant joins the online meeting by way of a participant networked computer and wherein the session leader joins the online meeting by way of a session leader networked computer;
    determining a participant IP address wherein the participant IP address corresponds to an IP address of the participant networked computer;
    determining a session leader IP address wherein the session leader IP address corresponds to an IP address of the session leader networked computer;
    determining a participant physical location corresponding to the participant IP address;
    determining a session leader physical location corresponding to the session leader IP address;
    determining a distance between the participant physical location and the session leader physical location;
    determining a quantity of air emission savings corresponding to foregoing a transportation of a round-trip transportation; and
    displaying the quantity of air emission savings on a user interface accessible by at least one participant and the session leader;
    wherein the step of determining a quantity of air emission savings corresponding to foregoing a transportation of the participant from the participant physical location to the session leader physical location is performed as an automobile emissions calculation when the participant physical location is less than a threshold distance from the session leader physical location and performed as an aircraft emissions calculation when the participant physical location is greater than the threshold distance from the session leader physical location.

2. The method of claim 1 wherein the quantity of air emission savings comprises a quantity of $CO_2$ emissions.

3. The method of claim 1 wherein the quantity of air emission savings comprises a quantity of $NO_x$ emissions.

4. The method of claim 1 wherein the quantity of air emission savings comprises a quantity of a plurality of air pollutants.

5. The method of claim 1 wherein the round-trip transportation comprises an personal vehicle transportation modality.

6. The method of claim 1 wherein the round-trip transportation comprises a commercial aircraft transportation modality.

7. The method of claim 1 allowing the user to specify a modality of the round-trip transportation.

8. The method of claim 1 wherein the threshold distance is between about 100 to about 200 miles.

9. The method of claim 1 wherein the quantity is augmented by a running total of air emission savings before being displayed on the user interface.

10. A method implemented in an information handling system comprising:
    allowing a plurality of participants and a session leader to join an online meeting wherein each participant joins the online meeting by way of one or more participant networked computers and wherein the session leader joins the online meeting by way of a session leader networked computer;
    determining each participant IP address and a session leader IP address wherein each participant IP address corresponds to an IP address of the participant networked computer used by each participant to join the online meeting and wherein the session leader IP address corresponds to an IP address of the session leader networked computer;
    determining each participant physical location corresponding to each participant IP address and a session leader physical location corresponding to the session leader IP address;
    determining a plurality of participant distances between each participant physical location and the session leader physical location;
    determining a plurality of participant emissions quantities wherein each participant emissions quantity corresponds to foregoing a transportation of about twice each participant distance;
    determining a total air emission savings corresponding to about the sum of the plurality of participant emissions quantities; and
    displaying the total air emission savings on a user interface that is accessible by at least one of the plurality of participants and the session leader;
    wherein determining a quantity of air emission savings corresponding to foregoing a transportation of each participant from the participant physical location to the session leader physical location is performed as an automobile emissions calculation when the participant physical location is less than a threshold distance from the session leader physical location and performed as an aircraft emissions calculation when the participant physical location is greater than the threshold distance from the session leader physical location.

11. The method of claim 10 further comprising determining a total saved travel time of the participants and displaying the total saved travel time on the user interface.

12. The method of claim 10 further comprising displaying a total participant driving distance wherein total participant driving distance is about the sum of each participant distance.

13. A method implemented in an information handling system comprising:

allowing a plurality of participants and a session leader to join an online meeting wherein each participant joins the online meeting by way of one or more participant networked computers and wherein the session leader joins the online meeting by way of a session leader networked computer;

determining each participant IP address and a session leader IP address wherein each participant IP address corresponds to an IP address of the participant networked computer used by each participant to join the online meeting and wherein the session leader IP address corresponds to an IP address of the session leader networked computer;

determining each participant physical location corresponding to each participant IP address and a session leader physical location corresponding to the session leader IP address;

determining a meeting location;

determining a plurality of participant distances between each participant physical location and the meeting location;

determining a session leader distance between the session leader physical location and the meeting location;

determining a plurality of participant emissions quantities wherein each participant emissions quantity corresponds to foregoing a transportation of about twice each participant distance;

determining a session leader emissions quantity wherein the session leader emissions quantity corresponds to foregoing a transportation of about twice the session leader distance;

determining a total air emission meeting savings corresponding to about the sum of all of the participant emissions quantities and the session leader emissions quantity; and displaying the total air emission meeting savings on a user interface that is accessible by at least one of the plurality of participants and the session leader;

wherein determining a quantity of air emission savings corresponding to foregoing a transportation of each participant from the participant physical location to the meeting location is performed as an automobile emissions calculation when the participant physical location is less than a threshold distance from the meeting location and performed as an aircraft emissions calculation when the participant physical location is greater than the threshold distance from the meeting location; and wherein determining a quantity of air emission savings corresponding to foregoing a transportation of the session leader from the session leader physical location to the meeting location is performed as an automobile emissions calculation when the session leader physical location is less than a threshold distance from the meeting location and performed as an aircraft emissions calculation when the participant physical location is greater than the threshold distance from the meeting location.

14. The method of claim 13 further comprising augmenting the total air emission meeting savings by a running total of air emission savings.

15. The method of claim 14 further comprising displaying the running total of air emission savings on the user interface.

16. The method of claim 13 wherein the meeting location is specified by the session leader.

17. The method of claim 13 wherein the meeting location is constrained to occur at a location corresponding to at least one of the plurality of participants and the session leader.

18. The method of claim 17 wherein the meeting location is the session leader physical location.

19. The method of claim 13 wherein the meeting location is chosen so as to minimize a sum of (1) an overall travel distance of the plurality of participants and (2) a travel distance of the session leader.

20. A networked computer system for online collaborative web meetings between a host and a plurality of participants, said system comprising:

(a) a central processing unit (CPU) and electronics adapted to
  (1) determine an IP address of the host and IP addresses of the plurality of participants;
  (2) calculate a total distance between the host and the plurality of participants based on the IP address of the host and the IP addresses of the plurality of participants; and
  (3) determine an air emissions reduction corresponding to foregoing a transportation of the total distance by the plurality of participants; and (b) a user interface adapted to display the air emissions reduction that is accessible by at least one of the plurality of participants and the host; wherein the step of determining the air emissions reduction corresponding to foregoing a transportation of the total distance by the plurality of participants comprises determining an air emissions reduction corresponding to foregoing a transportation of a distance from each participant to the host is performed as an automobile emissions calculation when the participant is less than a threshold distance from the host and performed as an aircraft emissions calculation when the participant is greater than the threshold distance from the host.

* * * * *